United States Patent
Mercille et al.

(10) Patent No.: US 10,296,309 B1
(45) Date of Patent: May 21, 2019

(54) SYSTEMS AND METHODS FOR AUTOMATIC API GENERATION FOR BI-DIRECTIONAL COMMUNICATION BETWEEN NATIVE AND WEB-BASED COMPONENTS OF A MOBILE APPLICATION

(71) Applicant: Walmart Apollo, LLC, Bentonville, AR (US)

(72) Inventors: Richard Mercille, San Jose, CA (US); Benoit Lemaire, San Jose, CA (US); Krunal Shah, Milpitas, CA (US); Weijie Li, Milpitas, CA (US); Deepu Eswarath Ganapathiyadan, San Jose, CA (US); Bharath Marulasiddappa, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/880,286

(22) Filed: Jan. 25, 2018

(51) Int. Cl.
*G06F 8/20* (2018.01)
*G06F 8/30* (2018.01)
(Continued)

(52) U.S. Cl.
CPC .................. *G06F 8/38* (2013.01); *G06F 8/20* (2013.01); *G06F 8/315* (2013.01); *G06F 8/60* (2013.01); *H04L 45/563* (2013.01)

(58) Field of Classification Search
CPC ... G06F 8/20; G06F 8/315; G06F 8/36; G06F 8/38; G06F 8/453; G06F 8/60; G06F 8/61;
(Continued)

(56) References Cited

U.S. PATENT DOCUMENTS 6,272,559 B1 * 8/2001 Jones ...................... G06F 9/542
719/330
6,637,020 B1 * 10/2003 Hammond ................ G06F 8/34
717/107
(Continued)

OTHER PUBLICATIONS

S. Bosnic, I. Papp and S. Novak, "The development of hybrid mobile applications with Apache Cordova," 2016 24th Telecommunications Forum (TELFOR), Belgrade, 2016, pp. 1-4. (Year: 2016).*

(Continued)

*Primary Examiner* — Andrew M. Lyons
(74) *Attorney, Agent, or Firm* — Duane Morris LLP; Manita Rawat

(57) ABSTRACT

An approach is proposed to support automatic API generation for integration of web-based components with a native application. First, mini apps are included in a container, wherein the mini apps are web-based features assembled together as a bundle of JavaScript assets to be integrated with the native application on a mobile device. A set of APIs to the mini apps are then automatically generated based on pre-defined schemas in native code specific to the platform of the mobile device and merged with the mini apps into the container. The container is published to a repository at a central, team shared, location and imported to the mobile device for integration with the native application. Finally, a target mobile application is created by integrating the mini apps with the native application on the mobile device via the APIs, wherein the target mobile application is uploaded and made available to an end user.

20 Claims, 9 Drawing Sheets

(51) Int. Cl.
*G06F 8/38* (2018.01)
*G06F 8/60* (2018.01)
*H04L 12/771* (2013.01)

(58) Field of Classification Search
CPC . G06F 8/65; G06F 8/656; G06F 8/658; G06F 8/66; G06F 8/71; H04L 45/563
USPC .......................... 717/110, 118, 120, 168–178
See application file for complete search history.

(56) References Cited

U.S. PATENT DOCUMENTS

| | | | | |
|---|---|---|---|---|
| 7,155,705 | B1* | 12/2006 | Hershberg | G06F 8/73 717/137 |
| 8,020,141 | B2* | 9/2011 | Hunt | G06F 21/562 717/106 |
| 8,863,126 | B2* | 10/2014 | Poore | G06F 8/00 718/1 |
| 9,268,668 | B1* | 2/2016 | Lachwani | G06F 11/3664 |
| 2007/0039010 | A1* | 2/2007 | Gadre | G06F 8/315 719/328 |
| 2007/0162466 | A1* | 7/2007 | Claussen | G06F 17/2247 |
| 2009/0228896 | A1* | 9/2009 | Meijer | G06F 9/541 719/313 |
| 2010/0011446 | A1* | 1/2010 | Klucher | G06F 21/10 726/27 |
| 2011/0055826 | A1* | 3/2011 | Vidal | G06F 8/71 717/177 |
| 2013/0132422 | A1* | 5/2013 | Rogish | G06F 16/958 707/769 |
| 2013/0174154 | A1* | 7/2013 | Poore | G06F 8/00 718/1 |
| 2014/0136954 | A1* | 5/2014 | Ligman | G06F 17/2247 715/234 |
| 2014/0196013 | A1* | 7/2014 | Orr | G06F 11/3664 717/125 |
| 2014/0201328 | A1* | 7/2014 | Zhao | H04L 67/02 709/219 |
| 2014/0337414 | A1* | 11/2014 | Sojoodi | H04W 4/60 709/203 |
| 2015/0128105 | A1* | 5/2015 | Sethi | G06F 8/36 717/106 |
| 2015/0199197 | A1* | 7/2015 | Maes | G06F 8/71 717/122 |
| 2016/0034267 | A1* | 2/2016 | Wetzold | G06F 8/71 717/172 |
| 2016/0048645 | A1* | 2/2016 | Webb | G06F 19/324 705/2 |
| 2016/0080523 | A1* | 3/2016 | Sethi | H04L 67/34 706/12 |
| 2016/0092348 | A1* | 3/2016 | Straub | G06F 11/3684 717/124 |
| 2016/0224336 | A1* | 8/2016 | Zhou | G06F 8/71 |
| 2017/0300316 | A1* | 10/2017 | Lopyrev | H04L 67/1097 |

OTHER PUBLICATIONS

I. Dalmasso, S. K. Datta, C. Bonnet and N. Nikaein, "Survey, comparison and evaluation of cross platform mobile application development tools," 2013 9th International Wireless Communications and Mobile Computing Conference (IWCMC), Sardinia, 2013, pp. 323-328. (Year: 2013).*

M. Latif, Y. Lakhrissi, E. H. Nfaoui and N. Es-Sbai, "Cross platform approach for mobile application development: A survey," 2016 International Conference on Information Technology for Organizations Development (IT4OD), Fez, 2016, pp. 1-5. (Year: 2016).*

H. Lin and G. Lee, "Building a Secure Cross Platform Enterprise Service Mobile Apps Using HTML5," 2015 18th International Conference on Network-Based Information Systems, Taipei, 2015, pp. 162-166. (Year: 2016).*

Wikipedia, "Client-server model," Jan. 9, 2018, last retrieved from https://en.wikipedia.org/w/index.php?title=Client%E2%80%93server_model&oldid=819506427 on Mar. 17, 2019. (Year: 2018).*

Wikipedia, "Marshalling (computer science)," Dec. 30, 2017, last retrieved from https://en.wikipedia.org/w/index.php?title=Marshalling_(computer_science)&oldid=817771672 on Mar. 17, 2019. (Year: 2017).*

* cited by examiner

500

502
Import one or more mini apps to a platform of a mobile device, wherein the mini apps are web-based features assembled and packaged together as a bundle of JavaScript components to be deployed to and integrated with the application native to the platform of the mobile device 504
Enable bi-directional communication between the mini apps in JavaScript and the native to the platform of the mobile device by marshalling native code of the native application into a JavaScript project to be integrated with the imported mini apps in JavaScript and un-marshalling the JavaScript components of the mini apps to the native code of the native application over an information exchange mechanism 506
Create a target mobile application by integrating the mini apps with the native application on the mobile device over the information exchange mechanism 508
Upload the target mobile application to an app store to make the target mobile application available to an end user

FIG. 5

```
{
  "config": {
    "manifest": {
      "override": {
        "url": "git@github.com:user/ern-custom-manifest.git",
        "type": "partial"
      }
    }
  },
  "nativeApps": [
    {
      "name": "MyWeatherApp",
      "platforms": [
        {
          "name": "android",
          "config": {
            "containerGenerator": {
              "containerVersion": "1.2.3",
              "publishers": [
                {
                  "name": "github",
                  "url": "git@github.com:user/myweatherapp-android-container.git"
                },
                {
                  "name": "maven",
                  "url": "http://user.nexus.repo.com:8081/nexus/content/repositories"
                }
              ]
            }
          },
          "versions": [
            {
              "name": "1.0.0",
              "ernPlatformVersion": "0.5.0",
              "containerVersion": "1.2.3",
              "isReleased": true,
              "yarnlock": "3ed0a5981a22d89d3b30d6e2011b5b581581771c",
              "nativeDeps": [
                "react-native@0.42.0",
                "react-native-electrode-bridge@1.5.0",
                "react-native-ern-weather-api@0.19.0",
                "react-native-vector-icons@4.0.0",
                "react-native-code-push@1.17.1-beta"
              ],
              "miniApps": {
                "container": [
                  "react-native-weather-overview@1.0.0",
                  "react-native-weather-details@2.1.3",
                ],
                "codePush": [
                  [
                    "react-native-weather-overview@1.0.0",
                    "react-native-weather-details@2.0.0",
                  ]
                ]
              }
            }
          ]
        }
      ]
    }
  ]
}
```

Include one or more mini apps in a container, wherein the container is a library native to a platform of a mobile device, wherein the mini apps are web-based features assembled and packaged together as a bundle of JavaScript assets to be deployed to and integrated with the native application on the mobile device

904 —

Automatically generate a set of APIs to the mini apps based on pre-defined schemas in native code specific to the platform of the mobile device, wherein the APIs provide well-defined methods of communication between the mini apps and the native mobile application

906 —

Merge the APIs with the mini apps into the container

908 —

Publish the container to a repository at a central, team shared, location with a version number, wherein the version number of the container is updated every time the container is re-generated

910 —

Import the container from the repository to the mobile device for integration with the native application

912 —

Create a target mobile application by accessing and integrating the mini apps in the container with the native application on the mobile device via the APIs, wherein the target mobile application is uploaded to an app store and made available to an end user

FIG. 9

SYSTEMS AND METHODS FOR AUTOMATIC API GENERATION FOR BI-DIRECTIONAL COMMUNICATION BETWEEN NATIVE AND WEB-BASED COMPONENTS OF A MOBILE APPLICATION

CROSS-REFERENCE TO RELATED APPLICATIONS

This application is related to co-pending U.S. patent application Ser. No. 15/880,379, filed Jan. 25, 2018 and entitled "Systems and methods for cross platform information exchange mechanism for integrating web-based components with a native application," which is incorporated herein in its entirety by reference.

This application is related to co-pending U.S. patent application Ser. No. 15/880,217, filed Jan. 25, 2018 and entitled "Systems and methods for managing real time version control for integrating updated web-based components with a native application," which is incorporated herein in its entirety by reference.

TECHNICAL FIELD

This application relates generally to mobile application ("app") development platforms and, more particularly, relates to systems and methods to support a mobile app development platform configured to integrate web-based components or mini apps into a single mobile app.

BACKGROUND

Many existing mobile applications or apps running on various client devices (e.g., mobile devices, laptops, etc.) are so-called native applications, which are device-dependent and written in code native to and compiled to run with a particular processor having a set of instructions under a specific platform or operating system (OS) such as iOS, Android, Windows, etc. Such native applications typically are in contrast with web-based software components embedded in web applications, wherein the web-based components are typically written in device-independent code such as JavaScript and can run on various types of platforms, processors and/or OSes without modification.

With the exponential growth of the mobile apps, software development platforms have been provided to enable users/programmers to develop mobile app efficiently using various tools and components made available on such platforms. For a non-limiting example, one such platform is React Native, which allows a developer to build mobile apps using various declarative components in JavaScript. Although React Native enables the developer to build new mobile apps entirely from scratch on its platform, such JavaScript-oriented platform is not designed to allow such JavaScript-based mobile apps to interact or exchange information with other existing mobile applications that were written in native code. As a result, all these existing native mobile applications need to be rewritten in order to be compatible with the newly-developed apps in the same working environment as React Native. Such rewriting may incur significant cost in terms of resources and development time. It is thus desirable to be able to provide a mobile app development platform that is capable of supporting reuse of web-based software components for mobile app development.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 depicts a flowchart of an example of a process to support cross platform information exchange mechanism for integration of web-based components with a native application in accordance with some embodiments.

FIG. 7 depicts an example of configurations of the cauldron in a single JSON document in accordance with some embodiments.

FIG. 9 depicts a flowchart of an example of a process to support automatic API generation for integration of web-based components with a native application in accordance with some embodiments.

DETAILED DESCRIPTION OF EMBODIMENTS

Figure 1:
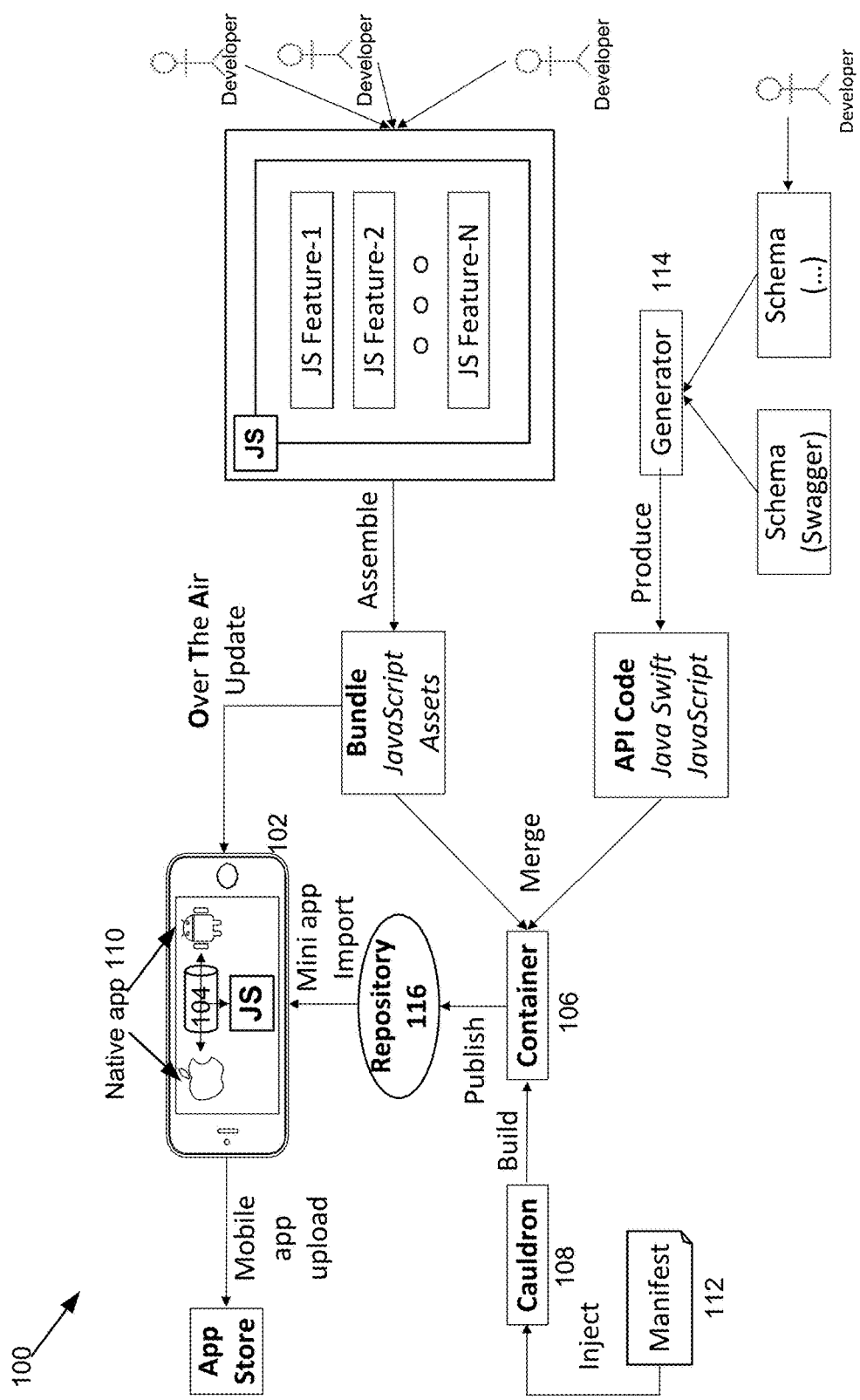
FIG. 1 depicts an example of a system diagram to support an integrated mobile app development platform in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support a mobile app development platform configured to integrate web-based components or mini apps written in, e.g., JavaScript, with source code native to a mobile device into a single mobile app. First, the mini apps are assembled and merged with native APIs automatically generated for the native code to access the web-based components into a container. The mini apps and their native dependencies in container are then published and imported to the mobile device and integrated with native code/app on the mobile device into an integrated/target mobile app over a cross platform information exchange mechanism or bridge. Whenever the mini apps are updated, versions of the mini apps and their native dependencies in the container are controlled by an application version control module or cauldron before the mini apps and their native dependencies are allowed to be imported to the mobile device for integration. Finally, the target mobile app is uploaded to an app store and made available for delivery to or download by an end user.

By enabling seamless integration of the web-based components in JavaScript and native code into a single mobile app, the proposed mobile app development platform allows reuse of existing code, knowledge, and other programming resources from both the web development and mobile app development worlds/environments without requiring developers in one environment to understand or rewrite the source code written for another. With such reuse of programming code and resources, the mobile app development platform simplifies mobile app development efforts and improves internal development competence and scalability with minimal changes to the existing native/mobile code base and environment/infrastructure.

FIG. 1 depicts an example of a system diagram to support an integrated mobile app development platform 100. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

Figure 2:
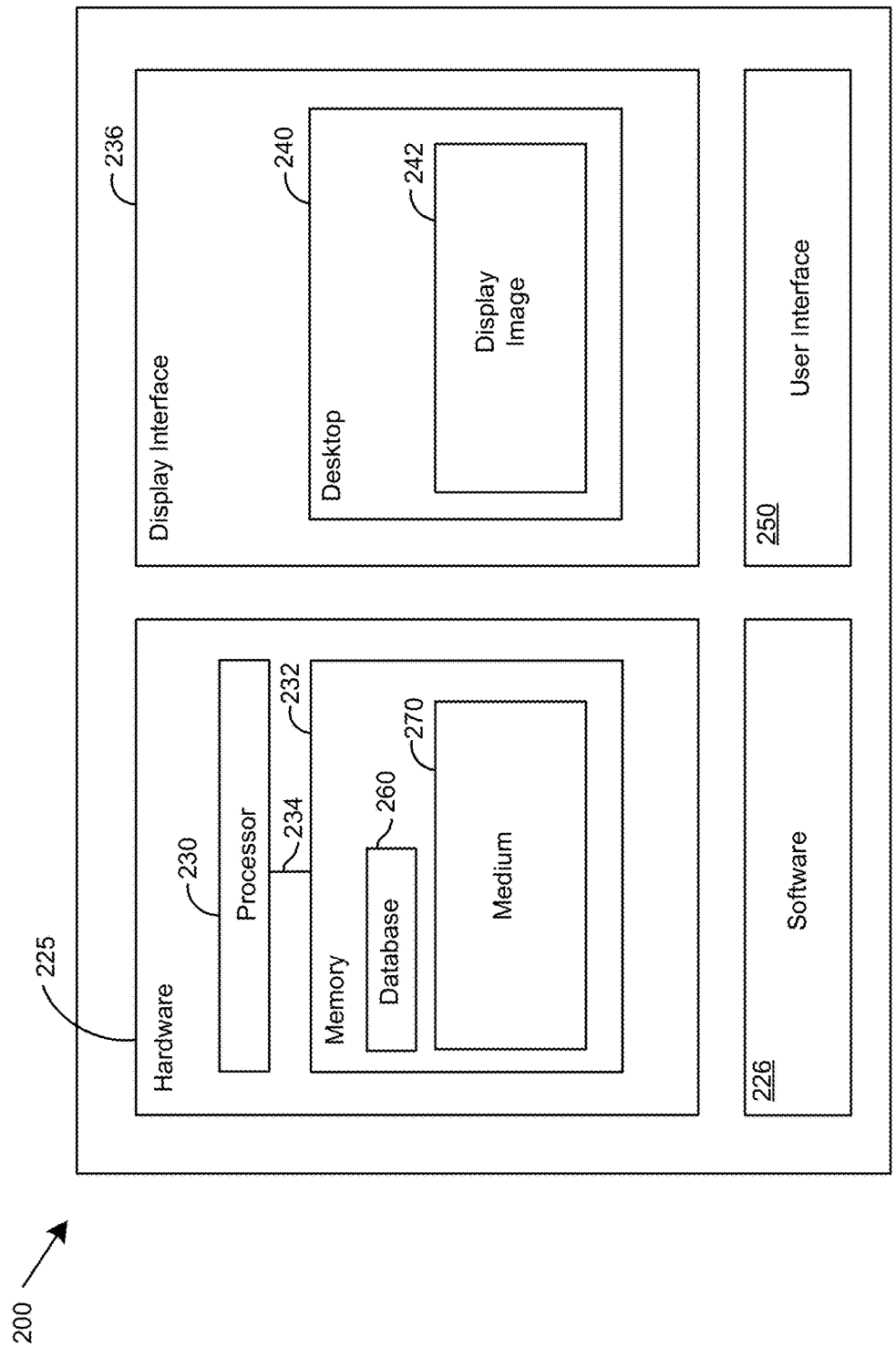
FIG. 2 is a block diagram of an exemplary computing device used in accordance with some embodiments.

In the example of FIG. 1, the integrated mobile app development platform 100 includes at least a cross platform information exchange mechanism or bridge 104 running on a mobile device 102, a container 106, and an application version control module or cauldron 108. Each of the bridge 104, the container 106 and the cauldron 108 runs on one or more computing devices/units/hosts 200 each having software instructions stored in a storage unit such as a nonvolatile memory (also referred to as secondary memory) of the computing unit for practicing one or more processes. FIG. 2 is a block diagram of an example of the computing device 200. In some embodiments, the computing device 200 includes a hardware unit 225 and software 226. Software 226 can run on hardware unit 225 such that various applications or programs can be executed on hardware unit 225 by way of software 226. In some embodiments, the functions of software 226 can be implemented directly in hardware unit 225, e.g., as a system-on-a-chip, firmware, field-programmable gate array ("FPGA"), etc. In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an ASIC, a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor." Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a few GB of RAM. Memory 232 can also be a ROM, a network interface (NIC), and/or other device(s).

In some embodiments, the computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones). In some embodiments, computing device 200 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, the computing device 200 includes an input or a user interface 250 for receiving input from a user. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

In some embodiments, the computing device 200 can include a database 260 within memory 232, such that various information can be stored within database 260. Alternatively, in some embodiments, database 260 can be included within a remote server (not shown) with file sharing capabilities, such that database 260 can be accessed by computing device 200 and/or remote end users. In some embodiments, a plurality of computer-executable instructions can be stored in memory 232, such as one or more computer-readable storage medium 270 (only one being shown in FIG. 2). Computer-readable storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein.

In the example of FIG. 2, the computing device 200 can be a communication device, a storage device, or any device capable of running a software component. For non-limiting examples, the computing device 200 can be but is not limited to a server machine, a laptop PC, a desktop PC, a tablet, a Google's Android device, an iPhone, an iPad, and a voice-controlled speaker or controller. The computing device 200 has a communication interface (not shown), which enables the hosts to communicate with each other, the user, and other devices over one or more communication networks following certain communication protocols, such as TCP/IP, http, https, ftp, and sftp protocols. Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

In some embodiments, the integrated mobile app development platform 100 is built on top of one or more existing app development platforms including but not limited to React Native and other tools such as Yarn and CodePush without any code modifications to these platforms and tools. In some embodiments, core of the integrated mobile app development platform 100 is written in JavaScript while some portions of the platform 100 also contain native code of the mobile device 102, for non-limiting examples, Java and Swift, mostly in the form of templates (e.g., Mustache) used for native code generation.

Bridge

In the example of FIG. 1, the bridge 104 is a low-level (e.g., transportation layer) bi-directional cross-platform information exchange mechanism running on the mobile device 102, wherein the bridge 104 is configured and utilized to simplify communication between the JavaScript components/mini apps imported from the container 106 and a native application 110 running on the mobile device 102. The bridge 104 enables seamless communication and automatic integration (or plugin) of web-based features of the mini apps (web-based features assembled and packaged together as a bundle of JavaScript) into the native application 110 to generate a target or final mobile application to be uploaded to the app store without involvement by the developers. For a non-limiting example, a shopping cart from a website can be a mini app. Here, the mobile device 102 runs a mobile operating system/platform such as iOS or Android. In some embodiments, the mobile device 102 contains two runner applications, one for each of the mobile operating system, wherein each runner application is used to run the mini apps for effective development, debug, and test of the mini apps before releasing a new or updated version of the mini apps. In some embodiments, both runner applications are simple and light-weight mobile applications, similar to new application projects in, e.g., Android Studio or Xcode.

In some embodiments, the bridge 104 is a native code module built on one of the existing native code platforms such as React Native and as with most native modules, the bridge 104 contains some JavaScript code as well as code native to iOS and Android platform. For a non-limiting example, in some embodiments, most of the code of the bridge 104 is native (95% native/5% JavaScript). In some other embodiments, the code of the bridge 104 is pure native based on native Android/iOS library/framework.

In some embodiments, the bridge 104 is configured to enable communications between the mini apps in JavaScript imported from the container 106 and the native application 110 by marshalling native code of the native application 110 into a JavaScript project to be integrated with the imported mini apps and un-marshalling the JavaScript components of the mini apps to the native code of the native application 110. In some embodiments, the bridge 104 is implemented following a client-server model wherein the imported mini apps and the native application 110 communicate/interact with each other following a client-server relationship.

Figure 3:
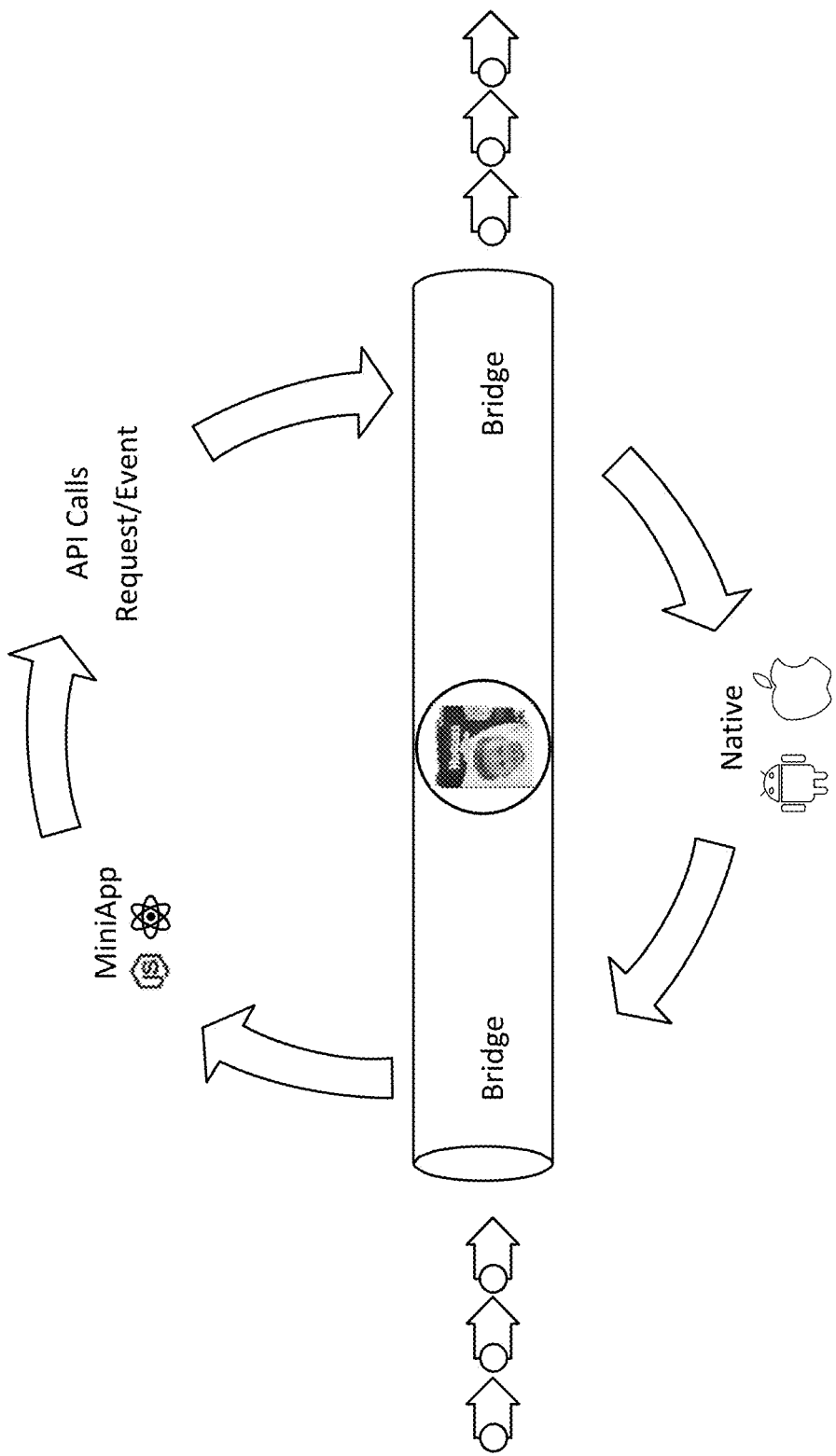
FIG. 3 depicts an example of communication exchange between the mini app and the native application over the bridge in accordance with some embodiments.

In some embodiments, the imported mini apps and the native application 110 may interact with each other through the bridge 104 via a set of Application Programming Interfaces (APIs) generated by the container 106 as discussed in details below, wherein the APIs provide well-defined methods of communication between the mini apps on the JavaScript side and the native application 110 specific to Android or iOS. FIG. 3 depicts an example of communication exchange between the mini app and the native application 110 over the bridge 104. As shown by the example of FIG. 3, the mini apps may access data or to trigger an action of the native application 110 via the APIs in the form of a request or an event.

Figure 4:
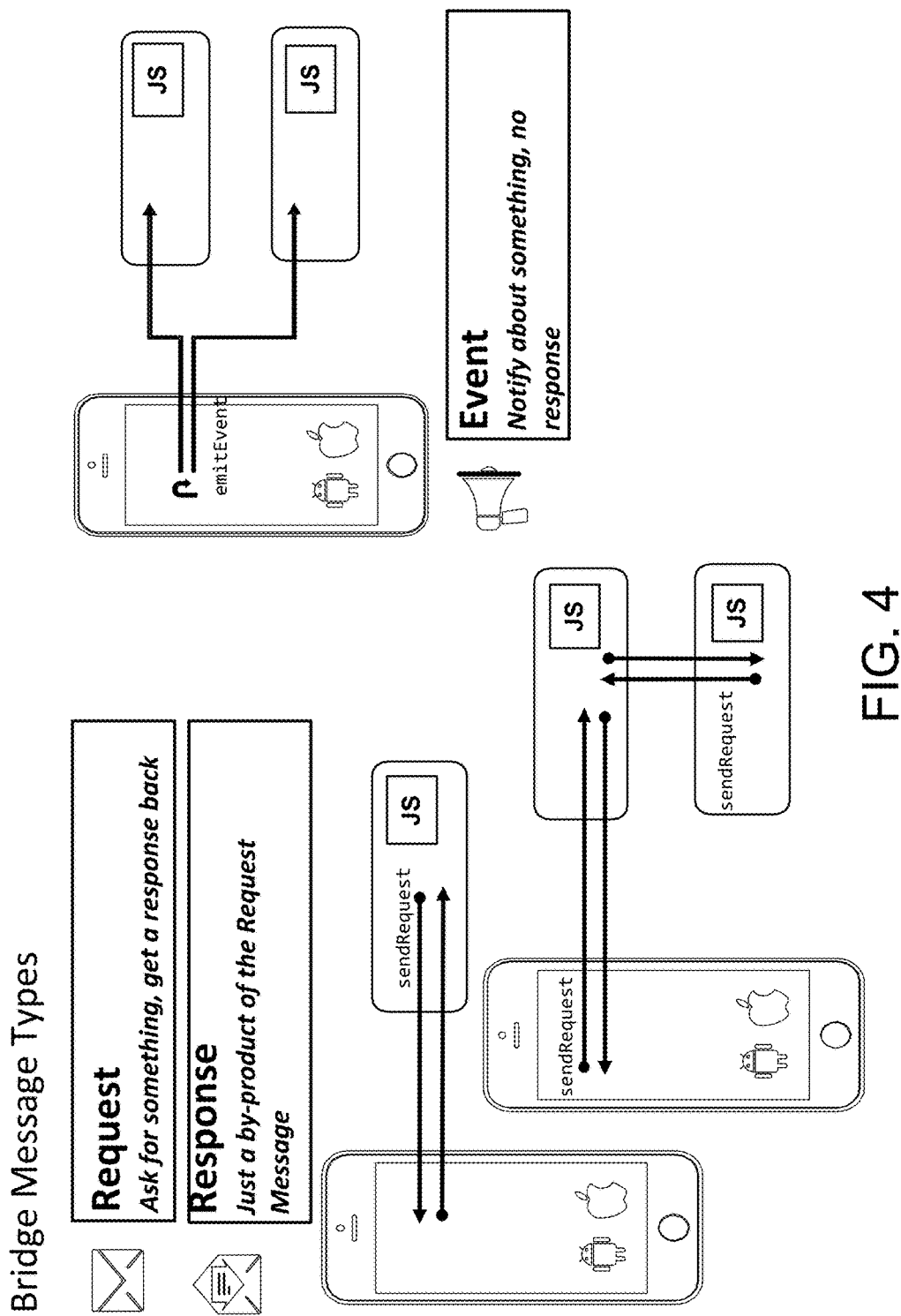
FIG. 4 depicts example of message types supported and processed by the bridge in accordance with some embodiments.

In some embodiments, the bridge 104 enables the JavaScript components/mini apps and the native application 110 to communicate with each other based on message exchanges. Specifically, the bridge 104 is configured to support and process at least the following three message types as depicted in FIG. 4:

Request. A Request message is used to request data from a receiver (a mini app or the native application 110) or to request an action to be performed by a receiver. The name is Request used to direct the messages to the associated receivers. For a non-limiting example, names for Request messages can be getMovieById or getAllMovies. A Request message always results in an associated response message that can contain either the requested data or indicate the result of an action. A Request message can optionally contain a payload. For any given Request message type, there can be only one associated receiver. The receiver handles the request and issues a response message. From a developer perspective, a Request message can be thought as being a method call.

Response. A Response message includes a result of a single Request message. A Response message can optionally contain a payload. From a developer perspective, a Response message can be thought as the return value of a method. The value can be of a specific type or not (void).

Event. An Event message is a "fire and forget" message. The sender (a mini app or the native application 110) of the Event message does not expect a response—so the receiver is known as a listener (the native application 110 or a mini app). For a non-limiting example, a name for Request messages can be movieListUpdated. Unlike a Request message, an Event message can be sent to multiple listeners. All registered listeners for a specific event message type will receive the Event message.

Note that the payloads for Requests, Responses, or Events can be primitive types, but the bridge 104 also supports complex object payloads (full-fledged model classes).

In some embodiments, the bridge 104 is configured to expose a public client surface that is consistent across all three platforms—JavaScript, iOS, and Android, and allows requests and responses between the mini apps on the JavaScript side and the native application 110 specific to Android or iOS. Specifically, the bridge 104 allows each side to, for non-limiting examples, send Requests (and the corresponding Responses), emit Events, register Requests handlers, and register or unregister Event listeners. When a Request message is sent from any side, the bridge 104 first attempts to find a registered receiver on the same side from where the message is sent. For a non-limiting example, if the Request message is sent from the mini app/JavaScript side, the bridge 104 first attempts to find a handler for it on the JavaScript side. If a handler is not found on the same side, the bridge 104 will then attempt to find a Register handler on the other side (in this example, the native application 110 side). Ultimately if no handler is found, the request fails with a specific error code. When an Event message is sent from any side, the bridge 104 looks for all registered listeners for this event type. The bridge 104 then sends the message to all registered listeners for that event type, independent of the side on which they are located.

FIG. 5 depicts a flowchart 500 of an example of a process to support cross platform information exchange mechanism for integration of web-based components with a native application. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 5, the flowchart 500 starts at block 502, where one or more mini apps are imported to a platform of a mobile device, wherein the mini apps are web-based features assembled and packaged together as a bundle of JavaScript components to be deployed to and integrated with the application native to the platform of the mobile device. The flowchart 500 continues to block 504, where bi-directional communication between the mini apps in JavaScript and the native to the platform of the mobile device is enabled by marshalling native code of the native application into a JavaScript project to be integrated with the imported mini apps in JavaScript and un-marshalling the JavaScript components of the mini apps to the native code of the native application over an information exchange mechanism. The flowchart 500 continues to block 506, where the mini apps are integrated with the native application on the mobile device over the information exchange mechanism to create a target mobile application. The flowchart 500 ends at block 508, where the target mobile application is uploaded to an app store to make the target mobile application available to an end user.

Cauldron

In the example of FIG. 1, the cauldron 108 is a centralized application version control module configured to store information about and control versions of the target mobile application, native dependencies of mini apps/JavaScript components on the native application 110, and information about the mini apps in the current container 106. In some embodiments, the cauldron 108 is bound to one target mobile application and there is one cauldron 108 per target mobile application. In some embodiments, a user/developer may utilize commands, instructions, and/or user interfaces provided by mobile app development platform 100 to access and modify the data stored in the cauldron 108 with appropriate permissions. In some embodiments, the cauldron 108 can be set up by creating and storing data in a repository (not shown), such as Git repository for distributed version control. Here, the repository is responsible for keeping track of changes to the mini apps/JavaScript components in the container 106 and/or the target mobile application as they change over time.

Figure 6:
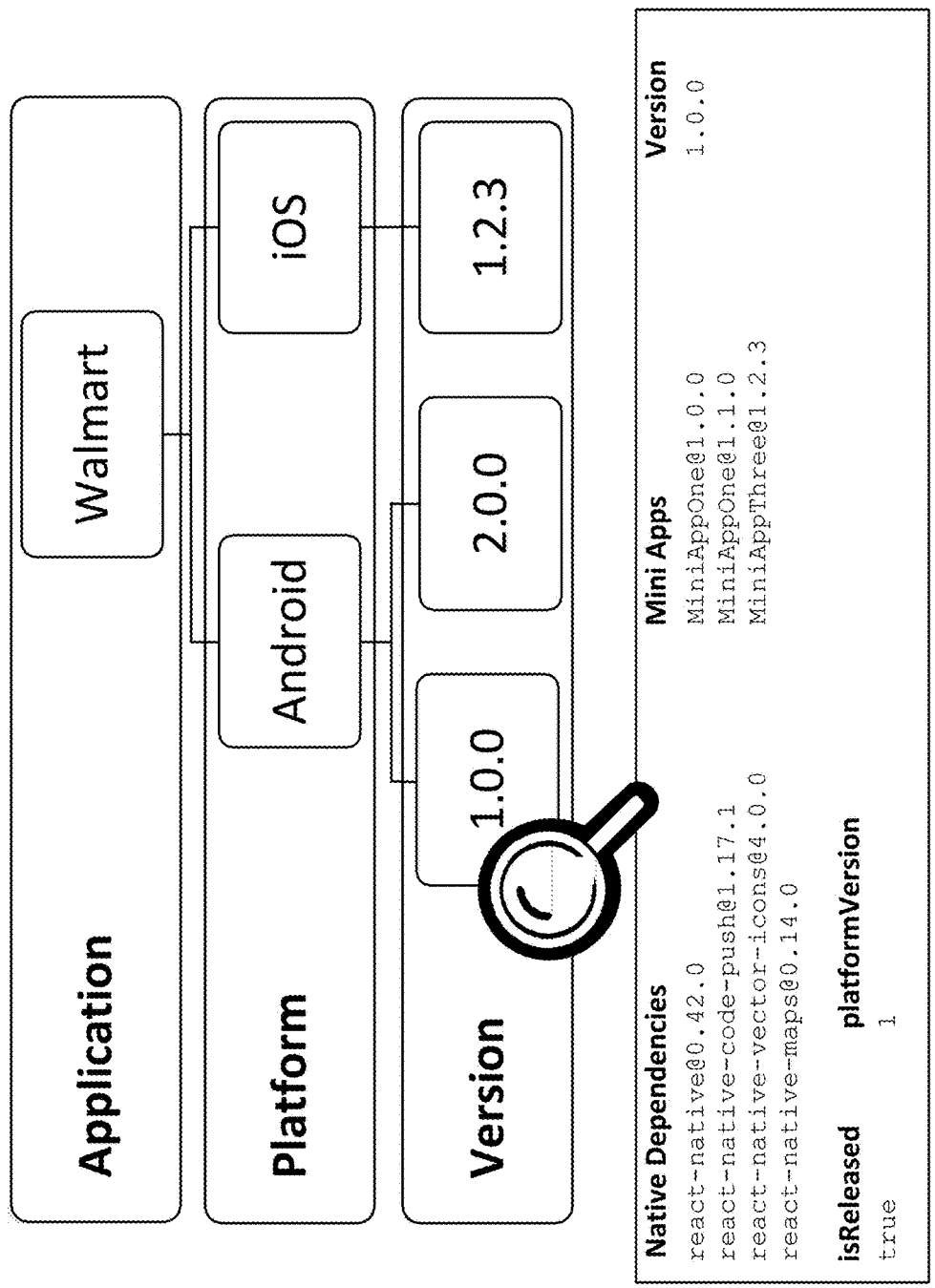
FIG. 6 depicts an example of information organized in a tree-like structure by levels of application, platform, and version in a cauldron in accordance with some embodiments.

In some embodiments, the cauldron 108 is configured to store and maintain at least one or more of the following information organized in a tree-like structure by levels of application, platform, and version as depicted by the example of FIG. 6:

One record at the top/application level for each target mobile application version that is part of the cauldron 108, e.g., Walmart iOS 17.15 and Walmart Android 17.10.0.

An array of platforms (Android and iOS) for the target mobile application at the second/platform level.

For each platform, there is data at the third version/level pertaining to multiple versions of the target mobile application including all mini apps (and their versions) that are currently part of it. For each specific version of the target mobile application, the cauldron 108 is configured to store release and/or lock information of the version.

A list of all native dependencies (and their versions) used by the mini apps (or not) in the current container 106 of a specific mobile application version.

A list of all versions of the mini apps that are part of the current container 106 and have been pushed as Over-the-Air (OTA) updates for any given mobile application version.

FIG. 7 depicts an example of configurations of the cauldron 108 in a single JavaScript Object Notation (JSON) document, wherein the JSON document includes at least the following:

Global configurations as well as a version of a single Android mobile application, e.g., MyWeatherApp 1.0.0.

The current version of the target mobile application contains two mini apps.

The current version of the target mobile application has been released and one update (codePush) has been performed to update the version of one of the two mini apps and the container generator configuration.

Note that information maintained by the cauldron 108 can only be updated using commands/instructions provided by the mobile app development platform 100. Such information should not be updated manually by a user because doing so would bypass all compatibility checks performed by the cauldron 108 discussed below and would risk de-synchronizing the current version of the container 106.

In order for a mini app/JavaScript component in the container 106 to be integrated into any target mobile application, the cauldron 108 associated to that mobile application needs to first check the mini app for version compatibility. For the native modules running on the mobile device 102, their versions (including the patch versions) must match exactly and the mobile app development platform 100 does not allow a mismatch between two different versions. If two different versions (including patch versions) of an identical native mobile application are used by two different mini apps, the native application 110 will not allow both mini apps to be added to the target mobile application.

In some embodiments, the cauldron 108 is configured to perform a series of version compatibility checks to confirm that the version of the mini app (to be added to the version of the target mobile application) contains only native dependencies that are supported by the platform and that the version is properly aligned with the version of the target mobile application. In some embodiments, the compatibility checks primarily focus on checking proper alignment of the versions of the native dependency—any native module in the native application 110 or API implementation that the mini app uses. The cauldron 108 performs such compatibility checks to make sure that any version of the mini app or native dependency added to a version of the target mobile application will not lead to runtime issues with other mini apps and dependencies that are already part of the container 106 for the native or target mobile application. Here, the cauldron 108 serves as a gateway of the mobile app development platform 100 to prevent and block any mini app incompatible with the current version of the native or target mobile app from being integrated. If any of these version compatibility checks fails, the mini app and/or its dependencies will not be included in a new version of the container 106 or shipped as an OTA update to the mobile device 102. This is one of the reasons not to modify the repository of the cauldron 108 manually as doing so results in bypassing compatibility checks.

The following is a list of some of the version compatibility checks and logic that is performed by the cauldron 108 when an operation changes the state of the mini app and/or the container 106—changes to what is included in the container 106 following the operation and/or the state of the composite JavaScript bundle.

When a new mini app is to be added to a version of an in-development target mobile application, the cauldron 108 checks each of the native dependencies included in the mini app. If the native dependency is already in the container 106, the same version of the native dependency will be used. If the native dependency is not already in the container 106, it will be added to the container 106. If the native dependency is already in the container 106 but with a different version, the cauldron 108 checks if that the versions are backward compatible. If so and the version of the dependency used by the mini app is greater than the one in the container 106, the cauldron 108 bumps the version of the dependency in the container 106 to the one used by the mini app. If that is not the case, the process fails.

When a new mini app is added to a version of a released target mobile application, the cauldron 108 checks each of the native dependencies included in the mini app. If the native dependency is already in the container 106, the same version of the native dependency will be used. If the native dependency is not already in the container 106, the compatibility checks fail since it is not possible to add a native dependency using OTA updates. If the native dependency is already in the container 106 but with a different version, the cauldron 108 checks if that the versions are backward compatible. If so and the version of the dependency used by the mini app is lower than the one in the container 106, the compatibility checks pass. Otherwise, the compatibility checks fail.

When an existing mini app is being removed from the target mobile application, the cauldron 108 does not perform compatibility checks and does not try to remove any of the native dependencies used by the mini app.

When a version of the mini app is being updated, the cauldron 108 performs compatibility checks the same way as when adding a new mini app is being added.

When native dependencies are directly added, updated, or removed in a version of the mini app, the following version compatibility checks are performed only for in-development versions of the target mobile application:

When a new native dependency is added, the cauldron 108 does not perform compatibility checks. If this is a new native dependency, it is added as it will not conflict with existing versions of native dependency.

When a native dependency version is updated, the cauldron 108 ensures backward compatibility—only forward version updates are allowed.

When a native dependency is removed, the cauldron 108 verifies that there are no Mini apps in the container 106 using the native dependency that is to be removed.

While the cauldron 108 performs compatibility checks to make sure that no misaligned or non-supported native dependency version makes it into the target mobile application, the manifest 112 is configured to align native dependency versions across multiple mini apps in the first place, wherein each platform version is associated to an array of supported native dependencies along with their versions as discussed above. In some embodiments, the mobile app development platform 100 is configured to store its master manifest 112 in a repository 116 such as GitHub, wherein the master manifest is public and open sourced so that anyone can add native dependency support.

If compatibility checks pass, a new version of container 106 is generated and published by the container 106, wherein the new container 106 is updated with the changes and the version data of the mini app stored in its cauldron 108 is updated accordingly to reflect the current new state of the new version of the container 106. Such update occurs when the new version of the target mobile application is still in the development phase and has not been released yet. If some dependencies versions are not compatible, a new container 106 will not be created. Similar compatibility checks happen when an update to the mini app is provided as an Over-the-Air (OTA) update as discussed below. In some embodiments, the cauldron 108 is configured to store one or more lock files that are used internally to guarantee consistency among non-updated versions of the mini app versions.

In some embodiments, the cauldron 108 is configured to enable OTA update to the current version of the mini app and/or its native dependencies on the native application 110, wherein the OTA update happens in real time whenever a new version of the mini app and/or its native dependencies become available. Unlike static update to the mini app and/or its native dependencies, which would require generating and importing a new version of container 106 to the mobile device 102, the OTA update publishes update to the current version of the mini app and/or its native dependencies to the mobile device 102 directly and immediately, e.g., in the form of a modified bundle of the mini app from the current container 106, without generating another version of the container 106. Once the OTA update is received, it is included in the target mobile application through automatic refresh of the target mobile application (instead of waiting for the next release of the mini app). As such, the OTA update allows real time update of real time changes to (e.g., snapshot of) the mini app and/or its native dependencies to the target mobile application to happen automatically without any user notice, awareness or action. In some embodiments, the cauldron 108 is configured to perform compatibility checks automatically as discussed above before an OTA update to ensure that such OTA update does not break version compatibility.

In some embodiments, the cauldron 108 is configured to maintain traceability of the mini app by keeping track of various versions of the mini app delivered to the mobile device 102 and integrated into the target mobile application over time. In some embodiments, the cauldron 108 is further configured to keep track of OTA updates to the mini app and/or native dependencies of the mini app over time. In some embodiments, upon a request by the user/developer of the mobile application, the cauldron 108 is configured to support rolling back the current version of the mini app to an earlier version identified by the user pending version compatibility checks. If the version compatibility checks pass, the cauldron 108 pushes the earlier version of the mini app and/or its native dependencies to replace the current version of the mini app in the target mobile application.

In some embodiments, the cauldron 108 is configured to limit access to its information on versions of the target mobile application and the native dependencies. In some embodiments, access to the cauldron 108 can be controlled by the repository of the cauldron 108, such as Git repository. In some embodiments, only one person, e.g., a release manager, is granted Write access to the cauldron 108 while developers of the mini app who need data from the cauldron 108 are granted Read access only. In some alternative embodiments, the developers of the mini app may be granted Write access to the cauldron 108 as well. In this scenario so that they may publish and add information of new versions of their mini apps directly to the cauldron 108 as soon as the mini apps are published.

Figure 8:
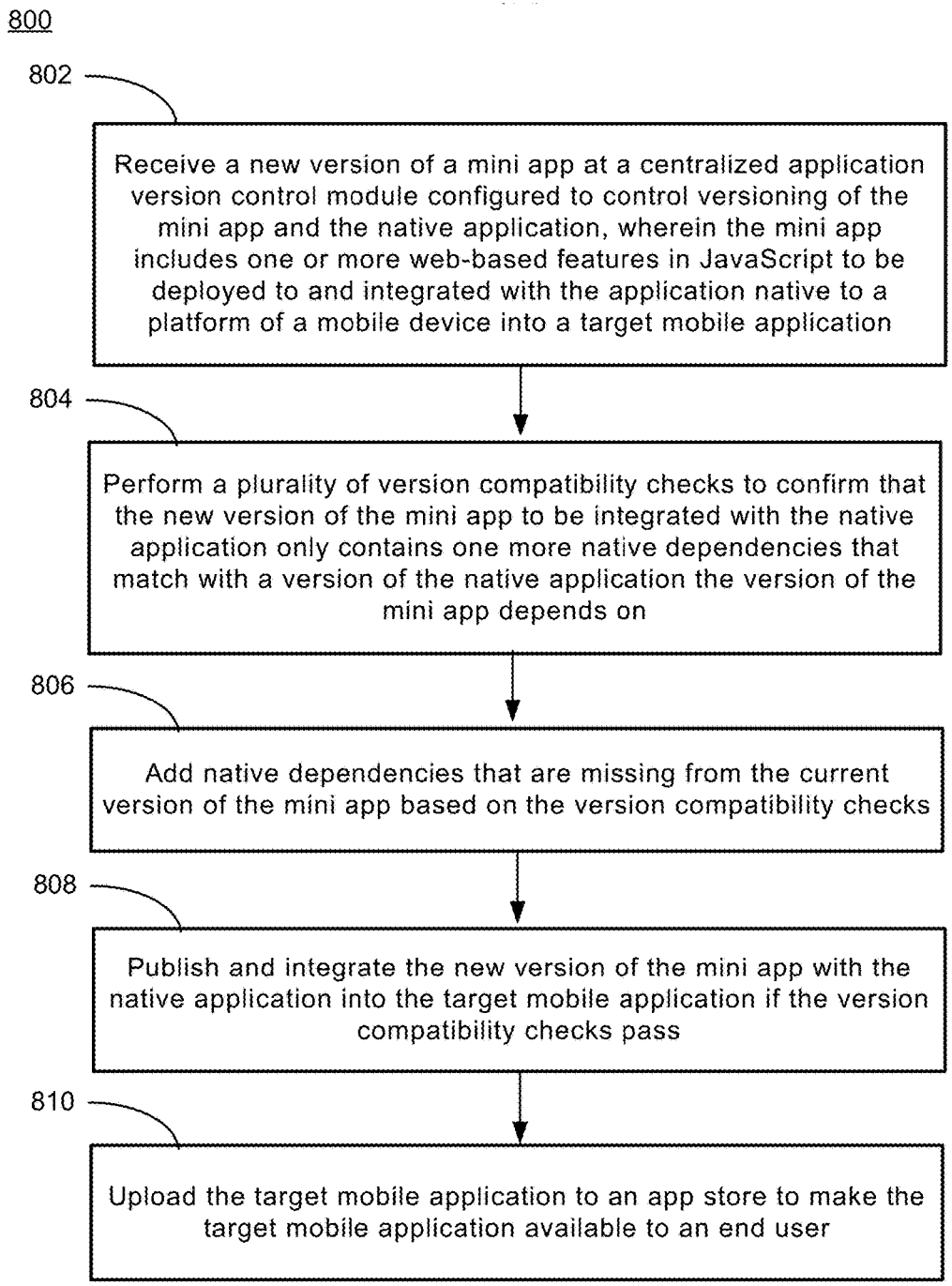
FIG. 8 depicts a flowchart of an example of a process to support real time version control for integrating updated web-based components with a native application in accordance with some embodiments.

FIG. 8 depicts a flowchart 800 of an example of a process to support real time version control for integrating updated web-based components with a native application. In the example of FIG. 8, the flowchart 800 starts at block 802, where a new version of a mini app is received at a centralized application version control module configured to control versioning of the mini app and the native application, wherein the mini app includes one or more web-based features in JavaScript to be deployed to and integrated with the application native to a platform of a mobile device into a target mobile application. The flowchart 800 continues to block 804, where a plurality of version compatibility checks is performed to confirm that the new version of the mini app to be integrated with the native application only contains one more native dependencies that match with a version of the native application the version of the mini app depends on. The flowchart 800 continues to block 806, where native dependencies that are missing from the current version of the mini app are added based on the version compatibility checks. The flowchart 800 continues to block 808, where the new version of the mini app is published and integrated with the native application into the target mobile application if the version compatibility checks pass. The flowchart 800 ends at block 810, where the target mobile application is uploaded to an app store to make the target mobile application available to an end user.

Container

In the example of FIG. 1, the container 106 is a library generated by the mobile app development platform 100, wherein the container 106 is configured to include and package automatically into the library one or more min apps of web-based components/features along with their native dependencies and assets detailed below, wherein the min apps are to be deployed to the mobile device 102 and integrated with the native mobile application. In some embodiments, the container 106 is native to the platform (iOS or Android) of the mobile device 102 in the form of a framework for iOS or a versioned Android Archive Library (AAR) for Android, respectively. In some embodiments, each mobile application may have its own customized container 106. In some embodiments, the min apps are web-based features written in JavaScript and are assembled and packaged together as a bundle of JavaScript assets. For a non-limiting example, the min apps can be JavaScript features developed on React Native.

In some embodiments, in order to facilitate the integration of the mini apps in JavaScript with the native mobile application, the container 106 is configured to generate native code for a set of APIs to the mini apps and merge the APIs with the bundle of JavaScript assets in the container 106. Here, the API code can be in, for non-limiting examples, Java, Swift, and/or JavaScript. In some embodiments, the container 106 is configured to publicly expose the APIs to enable the native application 110 to invoke, interact, integrate, and communicate bi-directionally with the imported mini apps/web-based components over the bridge 104 as discussed above.

In some embodiments, as discussed above, the native APIs are generated automatically based on pre-defined schemas, e.g., Swagger, which is an open source software framework, by a generator 114 specific/native to a platform used by the mobile device 102 without requiring any involvement by the developers of the mini apps to deal with converting or rewriting the mini apps in JavaScript to code native to the platform of the mobile device 102. Such native APIs enable smooth reuse and integration of the web-based assets into the native application 110 in the context of mobile app development integration.

In some embodiments, the generated APIs result in a cross platform API project that includes the client-side code of the APIs for all three platforms (JavaScript/Android/iOS), along with an optional API module. Since the APIs are generated from predefined schemas, the APIs do not require a specific container injection or configuration. In some embodiments, the generated APIs also contains necessary hooks to implement the APIs. For a non-limiting example, if a movie API defines a getAllMovies request, the API project also contains hooks to write the actual request handling code and return the appropriate response—in this example, the collection of all movies. Note that the API project and the implementation of the APIs remain separate to allow multiple implementations for any given API and to offer the possibility to switch between different implementations. The API module contains only generated code and any regeneration of the API module (e.g., following a schema update) will actually overwrite any custom made user code modifications. Note that while the APIs are implemented in a dedicated standalone project, which favors of the mini apps and switching of implementations of the APIs, it might not be possible in certain context to implement a standalone API project. For a non-limiting example, if the native API implementation is dependent on the mobile application code itself, it is preferable to perform the API implementation directly inside the native application 110.

In some embodiments, an API implementation implements the handling of requests and events from the APIs. For a non-limiting example, the API implementation implements the actual logic behind the getAllMovies request. In some embodiments, the API implementation is done on one "side" only, e.g., the mini apps side or the native application 110 side. For a non-limiting example, an implementation of a given API can be a native implementation (iOS and/or Android) or a JavaScript implementation—but not both, at least not in the same API implementation module. In some embodiments, there are multiple implementations for a given API. For a non-limiting example, it is possible to have a JavaScript implementation and a native implementation of the same API, but only one implementation for any API can be used at runtime.

In some embodiments, the mini apps may not directly depend on the API implementations as that would make switching between API implementations for the same APIs more complex. The mini apps should therefore only depend on the APIs and can have some API implementations as development dependencies only. For a non-limiting example, an API with a native implementation (iOS or Android) can possibly have a cross-platform JavaScript mock implementation of it, that can be used during development to launch the mini app standalone.

In some embodiments, the container 106 allows for patch version bump for versioning of the APIs and the API implementations, which bumps the current version of the APIs to the next one, e.g., from 1.0.0 to 1.0.1 when the APIs contain changes to the internal implementation and not to the public implementation. Because the APIs are fully generated automatically and should not to be modified manually, such version bump should only occur when an API is regenerated following a platform version update that contains internal changes such as bug fixes. For API implementations, patch bump is allowed if internal modifications are made to one or more event(s)/request(s) implementation. In some embodiments, the container 106 allows for minor version bump, e.g., from 1.1.0 to 1.2.0, when the APIs contain one or more new requests or new events. In some embodiments, the container 106 allows for major version bump, e.g., from 1.0.0 to 2.0.0, when the APIs contain breaking changes to its public implementation, e.g., if an existing request or event is removed or renamed.

In some embodiments, the container 106 offers more flexibility for deploying mini apps to the mobile device 102 that are using API versions not strictly aligned with API versions defined in the container 106. Specifically, when a mini app that contains an API version that exists in the container 106 with a different patch version is to be deployed, the container 106 assumes binary compatibility and allows APIs with a different patch version to be used. When a mini app that contains an API version that exists in the container 106 with a different minor version is to be deployed, the bridge 104 assumes binary compatibility and allows APIs with a different minor version only if the version stored in the container is greater than the one used by the mini app. When a mini app that contains an API version that exists in the container 106 with a different major version is to be deployed, the container 106 considers binary incompatibility and does not allow such deployment.

In some embodiments, the container 106 includes one or more of the following:
  The mini apps packaged inside a single JavaScript bundle containing all of the JavaScript code of all the mini apps.
  Assets of the mini apps including but not limited to fonts and images used by the mini apps.
  Native dependencies of the mini apps directly or indirectly depend on, including all dependencies on the native application 110, native platform API implementations and/or third-party (e.g., React Native) native modules used by the native application 110 that do not depend directly or indirectly on the mini apps.
  Code that is specific to the container 106 and exposed to the mobile application developers to properly integrate the container 106 in the target mobile application. For non-limiting examples, such code is used to initialize the container 106 along with some utility code to access and deal with the mini apps stored within.

In some embodiments, the container 106 is published to a repository 116 at a central, team shared, location. For non-limiting examples, the following two publishers can be used to publish the container 106 depending upon the platform of the mobile device 102:
  The Maven publisher can be used to publish the container 106 on an Android platform. Specifically, upon generation and compilation of the container 106, Maven publishes the resulting AAR artifact to the repository 116 from which the container 106 can be imported to the mobile device 102.
  The Git publisher can be used for publishing the container 106 for both the Android and the iOS platforms. After the container 106 is generated, the Git publisher also publishes the generated container project to the repository 116, e.g., GitHub first.

In some embodiments, the published container 106 is versioned and its version number is updated every time the container 106 is re-generated. For the Maven publisher, the version is part of the AAR artifact. For the Git publisher, a Git tag is used to denote the version. Because the container 106 includes some native code, the container 106 is primarily used during the development lifecycle of a version of the mobile application. As a result, a newly generated container 106 cannot be used in a version of the mobile application that has already been released. When a mini app is updated OTA as discussed above, the newly generated container 106 is not included because native code cannot be shipped through OTA.

In some embodiments, publication configuration of the container 106 is part of the configuration object stored in the cauldron 108 and thus can be shared across users of the cauldron 108. In some embodiments, the configuration object can be stored under a specific platform level in the configuration document of the cauldron 108 as shown by the example depicted in FIG. 7 discussed above. As shown in the example of FIG. 7, the publishers array contains all the publishers used to publish the container of MyWeatherApp Android to two destinations—a GitHub repository and a Maven repository. For the GitHub repository, the code of the container is published and a Git tag will be used for the version. For the Maven repository, the container is compiled and the resulting versioned AAR will be published to the Maven repository.

Once published, the container 106 is added/imported from the repository 116 to the mobile device 102 for integration with the native application 110. For Android platform, the container 106 can be added to/integrated with a mobile Android application project in one of two ways:
  By adding a dependency on the container AAR or
  By directly adding the container module to the Android project as a Git submodule. Specifically, when the container 106 is added to the mobile Android application as an AAR and a Maven publisher has been configured in the cauldron 108, the container 106 is packaged and published as a Maven artifact containing the AAR file—either to a local or remote repository 116. In some embodiments, the Maven artifact may include one or more of the following values: Group ID, e.g., com.walmartlabs.ern, Artifact ID: {mobile-app-name}-ern-container, and Version string {container-version}. Here, the {mobile-app-name} is the name of the mobile application in the cauldron 108 generated for the container 106. For a non-limiting example, if the application name is walmart, the container artifact ID will be walmart-ern-container. The {container-version} is the version of the generated container 106, which can be in the form: x.y.z where x, y and z are integers. For a non-limiting example, 1.2.3 is a valid container version. A version for a container 106 can be user-specified or the current version is patched/bumped to the new version by default. In some embodiments, a native dependency on the container 106 can be added to the native application 110 by updating the dependencies object of the application. Alternatively, the container 106 can be included in the native application 110 by adding it as an Android module, e.g., a Git submodule, when there is no Maven repository to publish the container 106 to. In order to add the container 106 as an Android module, a GitHub publisher is added to the cauldron 108. Then, when a new version of the container 106 is published, the container 106 is published to a private or public repository, which creates a Git tag for each version of the container 106. The Android module of the container 106 is then added to the native application 110 managed as a Git submodule.

Note that a conflict resolution strategy needs to be adopted to resolve conflict when some third-party libraries used by the native application 110 conflict with the versions of the container 106. For example, if the native application 110 depends on a specific version of a networking library, such as OkHttp, the version of the networking library used in the container 106 has to align with the version of the native application 110.

For iOS platform, the container 106 can be added as a dependency to a mobile iOS application such as Xcode project in one of two ways:

- By using a dependency manager such as Carthage or
- By performing a manual installation Specifically, to add the container 106 using Carthage, a new Cartfile is created or if an existing Cartfile of the container 106 is opened and a version of a Git module of the container 106, e.g., myweatherapp-ios-container.git v1.0.0 is added to the file. A conflict resolution file for the container 106 is similarly updated. The native dependencies of the container 106 is then installed. Alternatively, the container 106 is added manually by cloning the container 106 to a workspace, opening a project in Xcode and adding the cloned container 106 to the project.

In some embodiments, before accessing the mini apps stored within the container 106, the container 106 needs to be initialized. In some embodiments, the container is initialized during startup of the native application 110. If a class extending application is used, the container initialization call should be placed in the onCreate method of the class. If an application class is not used to initialize all libraries used by the native application 110, the container initialization code can be placed wherever appropriate. For Android platform, the initialization of the container 106 is done as a single call of an initialize static method of a class of the container 106 such as ElectrodeReactContainer.initialize(
this /* Application instance */,
new
ElectrodeReactContainer.Config( ).isReactNativeDeveloperSupport(BuildConfig.DEBUG)
/* Additional plugins configuration here */);

where the first parameter to this method is the Application instance, which is used as the call is made from an application extending class. The second parameter is the configuration of the container 106 and React Native. For iOS platform, the initialization of the container 106 can be performed through a static method of the platform, e.g., startWithConfigurations:
ElectrodeContainerConfig *containerConfig=[[ElectrodeContainerConfig alloc] init];
containerConfig.debugEnabled=RnDevSupportEnabled;
[ElectrodeReactNative startWithConfigurations: containerConfig];

where the first parameter is an implementation of the ElectrodePluginConfig protocol provided through the container 106, which allows a user to configure for both the container 106 and the underlying platform such as React Native. In the sample above, RnDevSupportEnabled, a static Boolean constant, is used to determine if developer support should be enabled or not.

In some embodiments, the initialize method might also contain additional parameters, one parameter per plugin configuration. For a non-limiting example, one configurable plugin is react-native-code-push, which is used to pass a deployment key to initialize this plugin with a debug mode can be enabled or disabled. Note that not all plugins (APIs or third-party native modules) are configurable, so most of them do not add an extra parameter to the initialize method.

In some embodiments, the container 106 creates, for an Android platform, one activity for each mini app included in the container 106 when the container 106 is created in order to launch the mini app. For a non-limiting example, if the container 106 includes a mini app named Hello, the container 106 will create an activity-extending class named HelloActivity, which will also be declared in the AndroidManifest.xml file of the container 106 so that the mini app can be launched from the target mobile application without extra setup. In some embodiments, all of these activities are stored in a namespace of the container 106, e.g., com.walmartlabs.ern.container.miniapps. To launch a mini app, the user only needs to start its corresponding activity. In some embodiments, initial properties can also be passed to the mini app as properties, which is useful if the mini app needs data when first launched. In some embodiments, a developer may use its own activity subclass to host the mini app by directly extending the MiniAppActivity class and override the relevant methods e.g., getMiniAppName( ). If the class cannot be extended due to a deep inheritance chain (Java does not support multiple inheritance), the developer may host the mini app in a Fragment instead and use the class as a template to create its own class.

In some embodiments, the container 106 provides, for an iOS platform, one viewing class, e.g., UIViewController, for each mini app included in the container 106 when the container 106 is created in order to launch the mini app. For a non-limiting example, for a mini app named Hello, the container 106 will create a UIViewController class that contains the Hello mini app. To launch a mini app, the user only needs to present its corresponding UIViewControllerby calling miniAppWithName:@<your-mini-app-name>. In some embodiments, the developer may also pass initial properties to the mini app and/or use its own subclass by overriding methods in the UIViewController class.

Given that the container 106 contains the mini apps and their native dependencies, the container 106 is regenerated and published (with a new version) every time the mini apps or their native dependencies are added, deleted, or updated. As such, every time the mini apps or their native dependencies are added, deleted, or updated for a given non-released version of the mobile application, a new version of the container 106 is automatically re-generated and published behind the scene.

FIG. 9 depicts a flowchart 900 of an example of a process to support automatic API generation for integration of web-based components with a native application. In the example of FIG. 9, the flowchart 900 starts at block 902, where one or more mini apps are included in a container, wherein the container is a library native to a platform of a mobile device, wherein the mini apps are web-based features assembled and packaged together as a bundle of JavaScript assets to be deployed to and integrated with the native application on the mobile device. The flowchart 900 continues to block 904, where a set of APIs to the mini apps are automatically generated based on pre-defined schemas in native code specific to the platform of the mobile device, wherein the APIs provide well-defined methods of communication between the mini apps and the native mobile application. The flowchart 900 continues to block 906, where the APIs are merged with the mini apps into the container. The flowchart 900 continues to block 908, where the container is published to a repository at a central, team shared, location with a version number, wherein the version number of the container is updated every time the container is re-generated. The flowchart 900 continues to block 910, where the container imported from the repository to the mobile device for integration with the native application. The flowchart 900 ends at block 912, where a target mobile application is created by accessing and integrating the mini apps in the container with the native application on the mobile device via the APIs, wherein the target mobile application is uploaded to an app store and made available to an end user.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support automatic application programming interface (API) generation for integration of web-based components with a native application, comprising:
a computing device configured to
include one or more mini apps in a container, wherein the container is a library native to a platform of a mobile device, wherein the mini apps are web-based features assembled and packaged together as a bundle of JavaScript assets to be deployed to and integrated with the native application on the mobile device;
automatically generate a set of APIs to the mini apps based on pre-defined schemas in native code specific to the platform of the mobile device, wherein the APIs provide well-defined methods of communication between the mini apps and the native mobile application;
merge the APIs with the mini apps into the container;
publish the container to a repository at a central, team shared, location with a version number, wherein the version number of the container is updated every time the container is re-generated;
import the container from the repository to the mobile device for integration with the native application;
create a target mobile application by accessing and integrating the mini apps in the container with the native application on the mobile device via the APIs, wherein the target mobile application is uploaded to an app store and made available to an end user.

2. The system of claim 1, wherein:
the container is a framework for iOS or a versioned Android Archive Library (AAR) for Android.

3. The system of claim 1, wherein:
the APIs are in Java, Swift, or JavaScript.

4. The system of claim 1, wherein said computing device is configured to:
implement the APIs in a dedicated standalone project, which enables reuse of the mini apps and switching of implementations of the APIs.

5. The system of claim 1, wherein said computing device is configured to:
publicly expose the APIs to enable the native mobile application to invoke, interact, integrate, and communicate bi-directionally with the imported mini apps.

6. The system of claim 1, wherein said computing device is configured to:
resolve conflict between the version number of the container and the native application.

7. The system of claim 1, wherein:
the container further includes assets of the mini apps and direct or indirect dependencies of the mini apps on the native application.

8. The system of claim 7, wherein said computing device is configured to:
regenerate and publish the container with a new version every time the mini apps or their native dependencies are added, deleted, or updated.

9. The system of claim 8, wherein said computing device is configured to:
allow patch version bump, minor version bump, or major version bump for versioning of the APIs from the current version to the next one, wherein the patch version bump happens when the APIs contain changes to internal implementation, wherein the minor version bump happens when the APIs contain one or more new requests or new events, wherein the major version bump happens when the APIs contain breaking changes to its public implementation.

10. A computer-implemented method to support automatic application programming interface (API) generation for integration of web-based components with a native application, comprising:
including one or more mini apps in a container, wherein the container is a library native to a platform of a mobile device, wherein the mini apps are web-based features assembled and packaged together as a bundle of JavaScript assets to be deployed to and integrated with the native application on the mobile device;
automatically generating a set of APIs to the mini apps based on pre-defined schemas in native code specific to the platform of the mobile device, wherein the APIs provide well-defined methods of communication between the mini apps and the native mobile application;

merging the APIs with the mini apps into the container;

publishing the container to a repository at a central, team shared, location with a version number, wherein the version number of the container is updated every time the container is re-generated;

importing the container from the repository to the mobile device for integration with the native application;

creating a target mobile application by accessing and integrating the mini apps in the container with the native application on the mobile device via the APIs, wherein the target mobile application is uploaded to an app store and made available to an end user.

11. The computer-implemented method of claim 10, further comprising:

implementing the APIs in a dedicated standalone project, which enables reuse of the mini apps and switching of implementations of the APIs.

12. The computer-implemented method of claim 10, further comprising:

publicly exposing the APIs to enable the native mobile application to invoke, interact, integrate, and communicate bi-directionally with the imported mini apps.

13. The computer-implemented method of claim 10, further comprising:

resolving conflict between the version number of the container and the native application.

14. The computer-implemented method of claim 10, further comprising:

regenerating and publishing the container with a new version every time the mini apps or their native dependencies of the mini apps on the native application are added, deleted, or updated.

15. The computer-implemented method of claim 14, further comprising:

allowing patch version bump, minor version bump, or major version bump for versioning of the APIs from the current version to the next one, wherein the patch version bump happens when the APIs contain changes to internal implementation, wherein the minor version bump happens when the APIs contain one or more new requests or new events, wherein the major version bump happens when the APIs contain breaking changes to its public implementation.

16. A non-transitory computer readable storage medium having software instructions stored thereon, wherein when executed by at least one processor, the computer-executable instructions cause the at least one processor to:

include one or more mini apps in a container, wherein the container is a library native to a platform of a mobile device, wherein the mini apps are web-based features assembled and packaged together as a bundle of JavaScript assets to be deployed to and integrated with the native application on the mobile device;

automatically generate a set of APIs to the mini apps based on pre-defined schemas in native code specific to the platform of the mobile device, wherein the APIs provide well-defined methods of communication between the mini apps and the native mobile application;

merge the APIs with the mini apps into the container;

publish the container to a repository at a central, team shared, location with a version number, wherein the version number of the container is updated every time the container is re-generated;

import the container from the repository to the mobile device for integration with the native application;

create a target mobile application by accessing and integrating the mini apps in the container with the native application on the mobile device via the APIs, wherein the target mobile application is uploaded to an app store and made available to an end user.

17. The non-transitory computer-readable storage medium of claim 16, wherein the computer-executable instructions further cause the at least one processor to implement the APIs in a dedicated standalone project, which enables reuse of the mini apps and switching of implementations of the APIs.

18. The non-transitory computer-readable storage medium of claim 16, wherein the computer-executable instructions further cause the at least one processor to publicly expose the APIs to enable the native mobile application to invoke, interact, integrate, and communicate bi-directionally with the imported mini apps.

19. The non-transitory computer-readable storage medium of claim 16, wherein the computer-executable instructions further cause the at least one processor to resolve conflict between the version number of the container and the native application.

20. The non-transitory computer-readable storage medium of claim 16, wherein the computer-executable instructions further cause the at least one processor to regenerate and publish the container with a new version every time the mini apps or their native dependencies of the mini apps on the native application are added, deleted, or updated.

* * * * *